Figure 1:
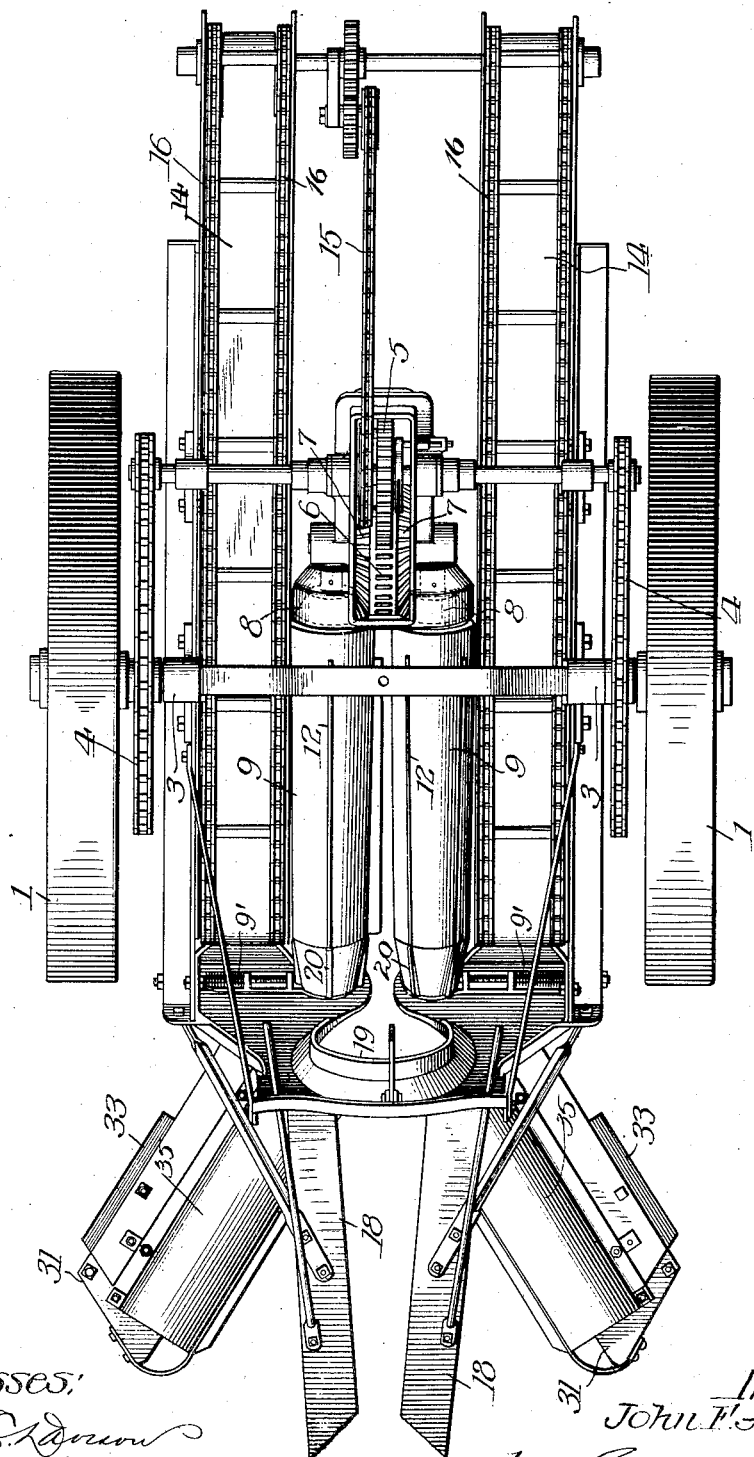

J. F. APPLEBY.
HARVESTER.
APPLICATION FILED FEB. 20, 1911.

1,105,235.

Patented July 28, 1914.
4 SHEETS—SHEET 1.

Witnesses:
Geo. C. Larson
Harold G. Barritt

Inventor:
John F. Appleby
by G. L. Cragg
Atty.

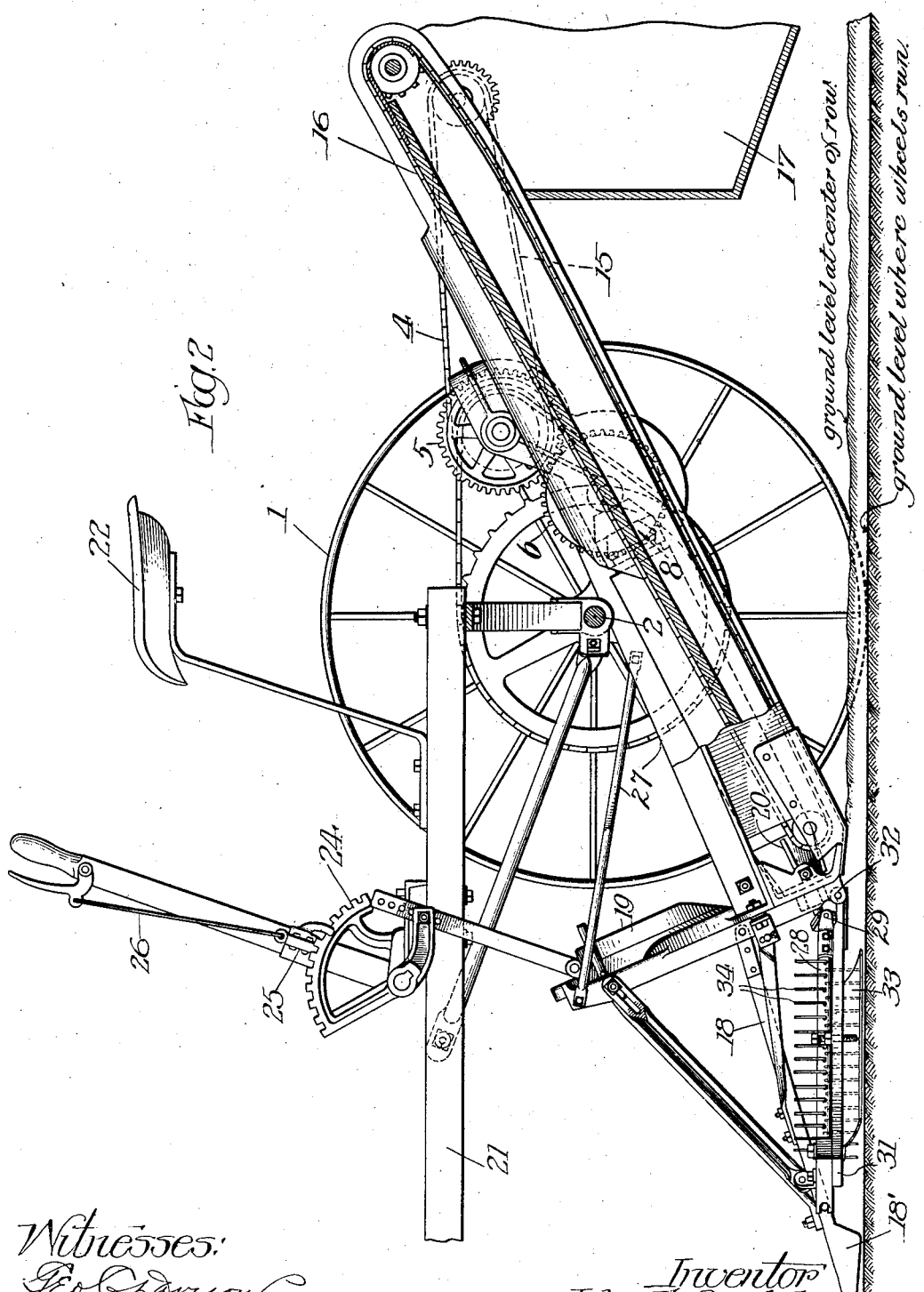

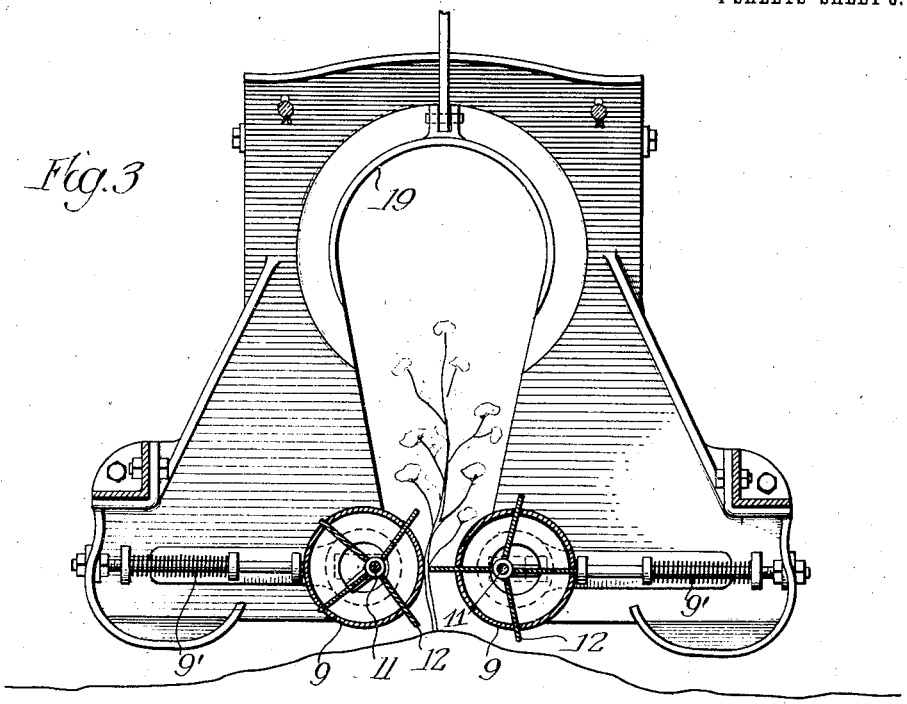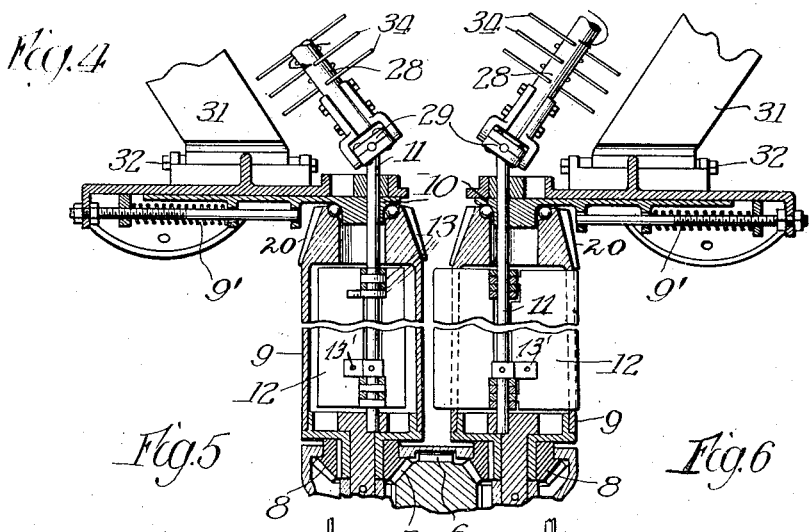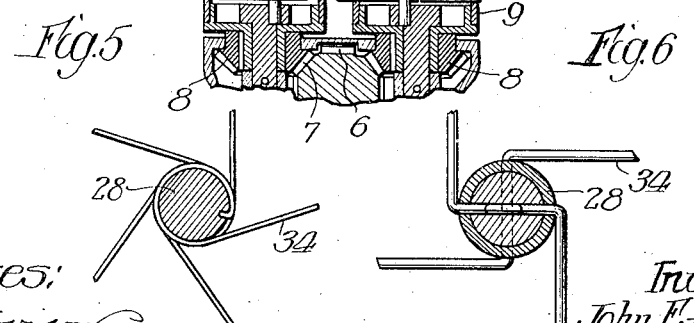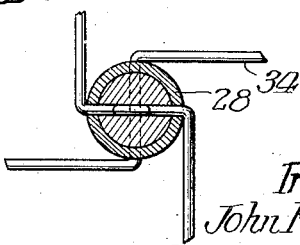

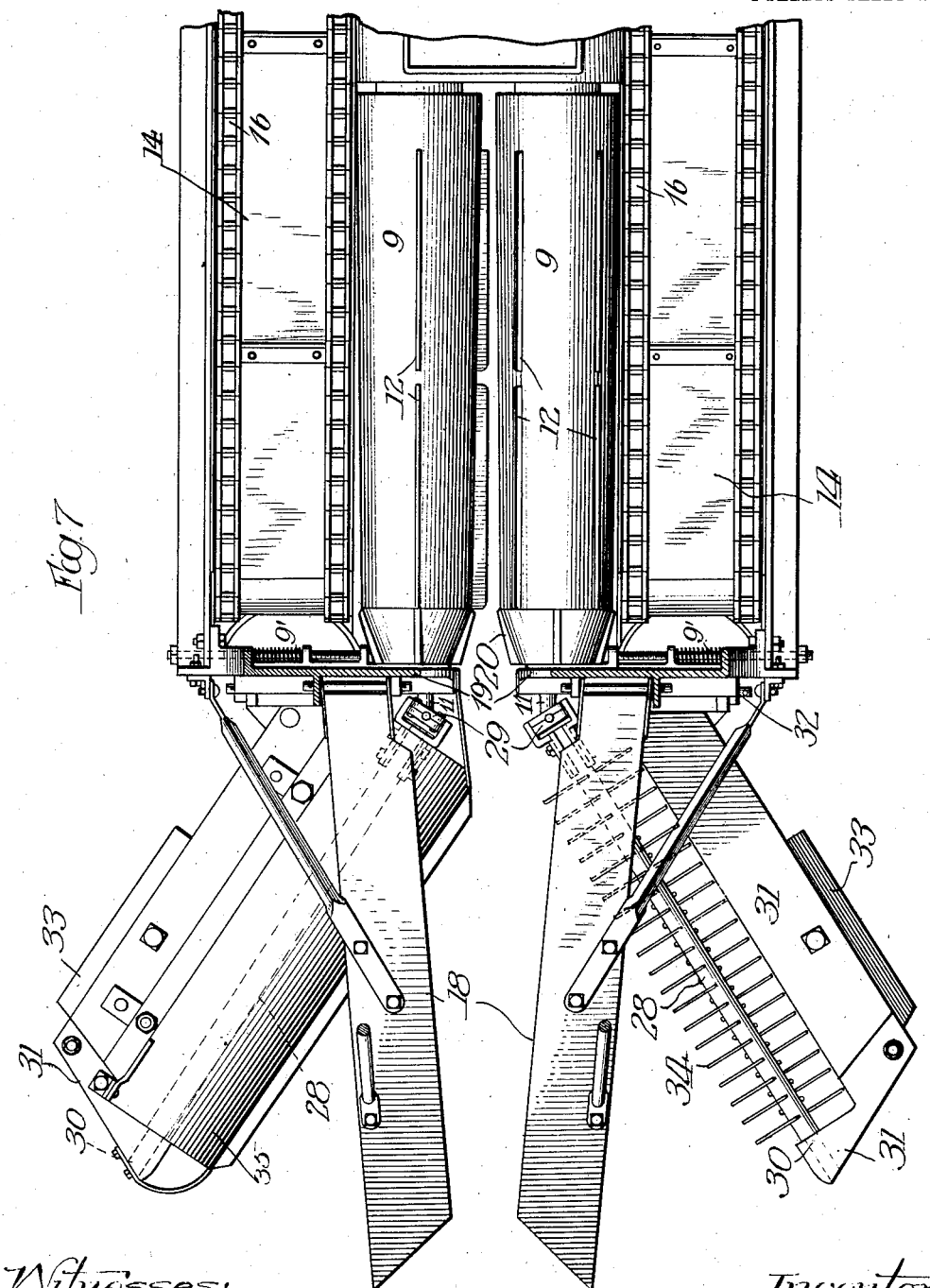

UNITED STATES PATENT OFFICE.

JOHN F. APPLEBY, OF CHICAGO, ILLINOIS, ASSIGNOR TO DIXIE COTTON PICKER COMPANY, OF CHICAGO, ILLINOIS, A CORPORATION OF SOUTH DAKOTA.

HARVESTER.

1,105,235.  Specification of Letters Patent.  Patented July 28, 1914.

Application filed February 20, 1911. Serial No. 609,699.

*To all whom it may concern:*

Be it known that I, JOHN F. APPLEBY, citizen of the United States, residing at Chicago, in the county of Cook and State of Illinois, have invented a certain new and useful Improvement in Harvesters, of which the following is a full, clear, concise, and exact description, reference being had to the accompanying drawings, forming a part of this specification.

My invention relates to harvesting machines and has for its object the provision of means whereby those plant products which are loose, that is which are detached from the plants, and which lie upon and close to the ground may be brought within the operating range of the plant product gathering mechanism of the harvester. My invention therefore is not to be limited to any particular class of harvesters although it finds a special utility in connection with cotton boll gathering machines.

My invention, viewed in one aspect, resides in the provision of means for casting the above mentioned plant product portions in line with the row of plants along which the harvesting machine is being drawn. When these plant product portions are located in alinement with the plants, they are brought within range of the plant product gathering mechanism of the harvester, first because the plant product gathering mechanism is peculiarly adapted to work upon the plant products when located in alinement with a row of plants, and second, because the ground is there higher, whereby the loose plant product portions are elevated when they have been shifted for the purpose described.

My invention, when viewed in another aspect, includes a rake structure which is adapted to comb the ground alongside of the rows of plants, thereby to bring the loose plant product portions within range of the plant product gathering mechanism, and this rake structure is desirably actuated so that it will not only perform a raking action, but will also serve to cast the loose plant products as has been described.

I will explain the preferred form of my invention as it is embodied in a boll gathering machine, though it is to be understood that my invention is not to be limited to any particular kind of machine which is adapted to gather plant product portions from rows of plants.

The accompanying drawings show the preferred embodiment of the invention when adapted to a cotton boll gathering machine and in which drawings—

Figure 1 is a plan view of the machine; Fig. 2 is a side elevation of the machine, some parts being broken away; Fig. 3 is a sectional view on line 3 3 of Fig. 4; Fig. 4 is a sectional plan view taken through the axes of the boll gathering rollers; Fig. 5 is a transverse sectional view through one form of rake structure; Fig. 6 is a transverse sectional view through another form of rake structure; and Fig. 7 is a plan view on a larger scale of the front portion of the machine, certain parts being removed and others being shown in section for the purpose of clearness.

Like parts are indicated by similar characters of reference throughout the different figures.

I will first describe the particular harvester in which my invention has been embodied, and will thereafter describe the novel features of my invention as they are associated with the balance of the harvester, it being understood that I do not wish to be limited to the particular harvester with which my invention has been incorporated.

The machine illustrated includes but two traction wheels 1 1 that are free to rotate upon the main shaft 2 in so far as such rotation will be permitted by well known clutching devices 3 which need not be further illustrated, as their construction and purpose is well understood, their function being to permit differential motion between the traction wheels as the harvester rounds curves, these clutching devices effecting fixed relation between said wheels and shaft when the harvester is being pulled forward in a straight line, and rotating freely upon the shaft when the harvester is being backed. Two sprocket chains 4 4 are driven by the traction wheels when the harvester is moving forward either in a curved or straight line and are not driven when the rotation of the traction wheels is reversed. These sprocket chains are in suitable driving relation with a spur gear 5 by instrumentalities which are illustrated in a general way and which are so well understood by those skilled in the art as to require no detailed description or illustration. The spur gear drives another spur gear 6 that is in mesh therewith, and the spur gear 6 in turn drives bevel gears 7 that are preferably integrally formed therewith. The bevel gears 7 are in mesh with bevel pinions 8 fixed with respect to the cylindrical rollers 9. The cylindrical rollers are journaled, by means of balls, to rotate upon non-rotating stub shafts 10 that are suitably mounted upon framework portions of the harvester. A journal rod 11, is eccentric with respect to the common axis of each of said stub shafts and rollers 9, the axis of the rod or shaft 11 being parallel with said common axis. Four ribs 12, spaced 90° apart, extend at their outer ends through slots in the rollers or cylinders 9 and three of them are journaled at their inner ends upon the shaft or rod 11, said ribs desirably having for this purpose inner ear extensions 13 that encircle the shaft. The upper ear 13' of one of the ribs is in firmly fixed relation with the shaft 11 so that said shaft is turned about its own axis for a purpose that will later appear. The degree of eccentricity of the shaft with respect to the stub shafts 10 is desirably such that when the ribs are bodily rotated with the cylinders and have their outer longitudinal edges at the middle of the machine, as indicated at the right in Fig. 3, such ribs will be projected to their outermost extents, each rib being gradually withdrawn during its succeeding half revolution until its outer end is flush with the periphery of the roller housing it, also as indicated in connection with the right hand roller in Fig. 3, each such rib being thereafter gradually projected until it is projected to its fullest extent during its next bodily half revolution. The ribs of each roller are in interleaving or intermeshing relation with the ribs of the other roller, whereby the ribs of one roller are brought into opposition with the cylindrical portions of the other roller when occupying insetting horizontal positions. Where the rollers are close enough together, the ribs desirably project more than half way across the space intervening between the rollers so as to insure the contact of all the plant products that are to be removed by the ribs. It will be observed that the cylindrical portion of each roller acts as a resisting surface for the ribs of the companion roller, whereby the plant products are sufficiently confined between the rib that is acting to strip the plant product from the plant and the coacting resisting surface. Spring mechanism 9¹ is employed to press the rollers toward each other in order that the less dense plants may be properly operated upon by the ribs 12 and which spring mechanism will yield sufficiently to accommodate plants of a density which could not well be received between the rollers when fully thrust toward each other by the spring mechanism. As I have preferably organized the machine, the rollers are caused to rotate in opposite directions with the upper portions of the rollers moving away from each other. The machine organized as illustrated is thus caused to pull the plant products from the plant, each rib acting in direct coöperation with the cylindrical portion of the roller presented to it, rather than in direct coöperation with a rib upon the companion roller, whereby the plant products are not pinched. By causing the ribs to be withdrawn gradually within the circumference of the rollers when they are brought to their outsetting horizontal positions, I am enabled first to effect the removal of the plant products from these ribs and second to place conveyers 14 in close proximity to the rollers and in positions to permit the rollers to discharge the plant products thereupon. These conveyers 14 may be of any suitable formation, the common form of belt conveyers being illustrated in the drawings, these belt conveyers being driven by sprocket chains 15 16. The plant products discharged upon the belt conveyers are conveyed upwardly and are discharged from the belt conveyers into a suitable receptacle 17. These belt conveyers are parallel with the rollers, the upper stretches thereof desirably lying in the same plane that includes the axes of the rollers.

In order to enable the machine of my invention to strip plant products from plants of varying heights and in order that the plants may be presented at the proper angle to the stripping ribs, I incline the rollers downwardly toward the front of the machine. By inclining the rollers downwardly, plant products at differing heights upon the plants are brought into contact with the gathering ribs. The machine is provided with two directing swinging fenders 18 at its forward end, whereby the plants are gathered laterally and are guided thereby into the space between the rollers. These fenders are elevated considerably above the ground by shoes 18¹ that ride upon the ground to prevent the fenders from dropping upon and digging into the ground. These gathering fenders are provided with a yoke 19 at their rear, through the space in which the plants are passed, the top of the yoke pressing the taller plants into proper positions to be operated upon by the rollers.

In order to insure the gathering of plant products that may lie close to the ground, I provide supplemental ribs 20 upon the bottoms of the rollers and in the same planes with the ribs 12, these supplemental ribs desirably sloping forwardly toward the axes of the rollers so that they may lie parallel with the ground when in their lowermost positions. These ribs 20 need not be arranged to be withdrawn into the rollers since they serve mainly to bring the lowermost plant products within the range of operation of the ribs 12, the conveyers 14, therefore, not being in direct coöperative relation with the ribs 20.

The machine may be equipped with a draft tongue 21 so as to permit it to be drawn by a pair of horses, a seat 22 being disposed upon the vehicle for the driver.

The entire roller mechanism and the gearing for operating it is mounted to swing bodily about the shaft 2. A locking segment 24 coöperates with a locking dog 25 to hold the manually operated mechanism 26 in any position to which it may be adjusted, this lever mechanism being mounted upon the tongue of the harvester and connected with the framework 27 carrying the roller mechanism, so that an adjustment of the lever mechanism will cause a bodily swinging adjustment of the roller mechanism about the shaft 2.

I have above described one form of harvesting machine which is provided with plant product gathering mechanism adapted to operate upon plant product portions of a row of plants, and having described an example of such a harvesting machine I will now describe the coöperative relation thereof with the mechanism which I have provided for bringing the loose plant product portions within the range of the plant product portion gathering mechanism.

It has been hitherto described how the shafts 11 are rotated about their own axes. These shafts are coupled with shafts 28 by means of universal joints 29, these joints serving to support the inner ends of the shafts 28, the outer ends of these shafts being journaled at 30 upon the bases 31 of housing structures which are pivotally connected at 32 with the frame-work that carries the rollers 9. Shoes 33 are carried by and below the bases 31 so as to hold the same substantially parallel with and a suitable distance above the ground in order to hold the shafts 28 substantially parallel with and a suitable distance above the ground. The shafts 28 are provided with rake teeth 34 that may be positioned as illustrated in Figs. 5 and 6, or in any other suitable way, and which project sufficiently far from the shaft to come sufficiently close to the ground at their free ends to be within range of the plant product portions lying upon the ground, the teeth 34 acting in advance of the ribs 12 and 20 upon the plant product portions lying upon the ground, the axes of movement of the rakes being such that the rake teeth turn transversely with respect to the ground. The shafts 28 diverge from the machine forwardly away from the plant row so as to reach a sufficient distance laterally of the row of plants upon which the machine is working in order to have the rake teeth 34 within range of substantially all of the loose plant product portions that lie on the ground beneath the plants. Hoods 35 cover the rake teeth, the hoods in some figures being removed for the sake of clearness. When the machine is in forward travel the shafts 11 are rotated in such directions that the teeth 34 at the bottom of the rake structures are moved upon or just over the ground toward the row of plants so that the loose plant product portions are cast and deposited upon the apex of the hill from which the plants spring, as indicated in Fig. 3, from which position the ribs 12 and 20 readily take these loose plant product portions and transfer them to the conveyer belts.

While I have herein shown and particularly described one way of carrying out my invention, I do not wish to be limited thereto as changes may readily be made in the embodiment of the invention illustrated without departing from the spirit of the invention.

Having thus described my invention, I claim as new and desire to secure by Letters Patent the following:—

1. A harvesting machine including plant product gathering mechanism for operating upon a row of plants; a pair of rake structures, having teeth, supplied in addition to the plant product gathering mechanism and located ahead of the plant product gathering mechanism and carried upon the machine so that each rake structure will diverge from the plant row upon which the plant product gathering mechanism operates and to be close to the ground to be within range of plant product portions that lie loose upon the ground laterally of the row of plants, these rake structures diverging in the direction of travel of the machine; and means operating while the machine is in forward travel for turning the bottoms of the rake structures toward the plant row to cause the rake teeth to turn transversely with respect to the ground whereby the latter plant product portions may be placed in substantial alinement with the row of plants upon which the machine is operating to enable the plant product gathering mechanism also to gather these latter plant product portions.

2. A harvesting machine including plant product gathering mechanism for operating upon a row of plants; a rake structure, having teeth, supplied in addition to the plant product gathering mechanism and located upon the machine so as to diverge from the plant row upon which the plant product gathering mechanism operates and to be close to the ground to be within range of plant product portions that lie loose upon the ground laterally of the row of plants; and means operating while the machine is in forward travel for turning the bottom of the rake structure toward the plant row to cause the rake teeth to turn transversely with respect to the ground whereby the latter plant product portions may be placed in substantial alinement with the row of plants upon which the machine is operating to enable the plant product gathering mechanism also to gather these latter plant product portions.

3. A harvesting machine including plant product gathering mechanism for operating upon a row of plants; a rake structure, having teeth, supplied in addition to the plant product gathering mechanism and located upon the machine so as to be close to the ground to be within range of plant product portions that lie loose upon the ground laterally of the row of plants; and means operating while the machine is in forward travel for turning the bottom of the rake structure toward the plant row to cause the rake teeth to turn transversely with respect to the ground whereby the latter plant product portions may be placed in substantial alinement with the row of plants upon which the machine is operating to enable the plant product gathering mechanism also to gather these latter plant product portions.

4. A harvesting machine including plant product gathering mechanism for operating upon a row of plants; a rake structure, having teeth, supplied in addition to the plant product gathering mechanism and located ahead of the aforesaid plant product gathering mechanism and carried upon the machine so as to diverge from the plant row upon which the plant product gathering mechanism operates and to be close to the ground to be within range of plant product portions that lie loose upon the ground laterally of the row of plants; and means operating while the machine is in forward travel for turning the bottom of the rake structure toward the plant row to cause the rake teeth to turn transversely with respect to the ground whereby the latter plant product portions may be placed in substantial alinement with the row of plants upon which the machine is operating to enable the plant product gathering mechanism also to gather these latter plant product portions.

5. A harvesting machine including plant product gathering mechanism for operating upon a row of plants; a rake structure, having teeth, supplied in addition to the plant product gathering mechanism and located ahead of the aforesaid plant product gathering mechanism and carried upon the machine so as to be within range of plant product portions that lie loose upon the ground laterally of the row of plants; and means operating while the machine is in forward travel for turning the bottom of the rake structure toward the plant row to cause the rake teeth to turn transversely with respect to the ground whereby the latter plant product portions may be placed in substantial alinement with the row of plants upon which the machine is operating to enable the plant product gathering mechanism also to gather these latter plant product portions.

In witness whereof, I hereunto subscribe my name this fifteenth day of February A. D., 1911.

JOHN F. APPLEBY.

Witnesses:
G. L. CRAGG,
GEO. C. DAVISON.